Nov. 5, 1963  B. BURSON, JR  3,110,011
ELECTRONIC CANCELLER FOR AUTOMOBILE TURN INDICATORS
Filed Sept. 2, 1960

INVENTOR
Benard Burson, Jr.

BY Henry Shur

ATTORNEY

United States Patent Office 3,110,011
Patented Nov. 5, 1963

3,110,011
ELECTRONIC CANCELLER FOR AUTOMOBILE
TURN INDICATORS
Benard Burson, Jr., P.O. Box 9231, Austin 56, Tex.
Filed Sept. 2, 1960, Ser. No. 53,732
17 Claims. (Cl. 340—56)

The present invention relates to improved control circuits of the electronic type adapted to effect a desired control operation after elapse of a predetermined time; and is more particularly concerned with an arrangement of the type described employed in conjunction with an automobile turn indicator and adapted to effect self-cancelling of a turn indication, after a time interval of operation, in the event that mechanical means conventionally associated with the turn indicator fail to effect such cancellation during said time interval.

Turn indicators of the type conventionally employed on automotive vehicles normally constitute a manually operable turn switch mechanism adapted to be moved in one or another direction when an indication of turning is desired; and adapted, when moved in either direction, to complete a circuit between the automobile battery through a flasher unit to an appropriate set of lights or other indicating mechanism on the automobile. The manual turn switch mentioned is normally associated with a mechanically operated cancel switch responsive to movement of the automobile steering wheel to effect return of the turn indicator switch to a neutral position after a turn has been completed. Under various driving conditions, however, the types of mechanical cancellation employed in conventional turn indicators are ineffective to effect cancellation of turn indication. A typical circumstance wherein such cancellation is not effected arises in open highway driving wherein the turn indicator may be employed to indicate intended movement of the vehicle from one lane into an adjacent lane; and upon completion of such a maneuver the turn indicator normally does not cancel, inasmuch as movement of the steering wheel has been insufficient to effect the desired cancellation, the normal cancel switch being set up for manipulations of the steering wheel effecting turning of the vehicle through an arc approaching 90 degrees. Under such circumstances, therefore, a turn indication, once made, may continue for an undesirably long time and may give faulty information regarding the intentions of the driver, unless the driver himself effects manual cancellation of the turn indication.

This general problem, and the driving hazards which may be engendered as a result, have been recognized in the past; and it has accordingly been suggested that turn indicators be associated with some form of additional automatic cancel mechanism operative to effect cancellation of a turn indication after such turn indication has been given for a time period, even though the steering wheel has not been moved through an arc sufficient to effect mechanical cancellation. The typical form of self-canceller suggested heretofore embodies a thermostatic element which in normal course tends to heat up as the turn indication continues over a period of time; and a bi-metallic strip, or the like, then effects cancellation after it has been heated sufficiently.

In practice, it has been found that thermostatic self-cancellers of the type mentioned above are in themselves subject to a number of distinct disadvantages. The recovery time of such thermostatic elements is relatively slow; and once the thermostatic canceller has been heated sufficiently to inactivate the turn indicator, a substantial recovery period is required before further control may be assumed by either the mechanical turn switch, or by the thermostatic element. As a result, it is possible for the driver of the car to attempt, by manual manipulation of the turn indicator switch, to indicate impending turns which are actually not indicated, if the thermostatic canceller is, during a given period of time, in a recovery stage whereby the entire turning indicating system is still deactivated. It is moreover possible for the turn indicator mechanism to cycle, i.e. once the turn indication has been cancelled by appropriate heating of the thermostatic element, the turn indicator is deactivated but may, after a period of time constituting the recovery period, be automatically reactivated if the mechanical cancel switch has not been moved to a neutral position in the intervening time.

It will be appreciated, therefore, that by reason of the forms of automatic cancellation structure suggested heretofore, even though self-cancellation is accomplished this self-cancelling operation may deactivate the entire turn indicator system for a sufficiently long period of time to prevent desired turn indications from being effected; and may on the other hand give spurious indications due to cycling deactivation and reactivation of the turn indicator system, as the thermostatic element heats and cools. As a result, self-cancelling turn indicators of the types suggested heretofore and described above may themselves impose driving hazards due to the inherent operation of these self-cancelling systems.

The present invention, recognizing these characteristics of automatic self-cancelling structures suggested heretofore, is accordingly concerned with an improved self-cancelling arrangement which obviates the spurious conditions of operation characteristic of thermostatic cancel switches. In particular, and as will be described hereinafter, the present invention is concerned with an electronic circuit, comprising in essence a capacitive charge and glow tube discharge arrangement, which is adapted to recover more quickly and to otherwise obviate the disadvantages of thermostatic type self-cancellers.

It is accordingly an object of the present invention to provide an improved control circuit, adapted to effect self-cancelling operation of automobile turn indicators after elapse of a predetermined period of time.

A further object of the present invention resides in the provision of an improved control circuit marketable as a separate unit, and adapted to be readily inserted into existing turn indicator circuits to permit automatic self-cancellation of turn indications in such circuits.

A further object of the present invention resides in the provision of an improved control circuit, particularly adapted to be used in conjunction with automotive turn indicators, having a faster recovery time and a non-cycling form of operation, thereby to obviate spurious turn indications characteristic of thermostatic self-cancellers.

A still further object of the present invention resides in the provision of an improved turn indicator arrangement adapted to provide more reliable operation and safer driving than has been possible in turn indicator arrangements suggested heretofore.

In providing for the foregoing objects and advantages, the present invention contemplates the provision of a control unit, adapted to be provided as original equipment or as a separate unit installable in conjunction with existing turn indicators for effecting improved automatic self-cancellation of a turn indication. The unit itself takes the form of a relay circuit cooperating with a capacitive charging circuit and glow tube discharge circuit so as to effect cancellation of a turn indication after a predetermined time. By reason of the particular circuit employed, the circuit, once it operates to effect a turn indication cancellation, is rendered substantially immediately available for further control operations; and in particular, once a turn indication is cancelled by the circuit of the present invention, a turn in the opposite direction may be immediately indicated or, by returning the manual switch to a neutral position and then back to its original position, a turn indication in the original direction can also be immediately indicated. No appreciable recovery time is involved, whereby deactivaiton of the entire turn indicator circuit for a significant period of time cannot occur. Moreover, the circuit, as will be described, is so arranged that once cancellation does occur, the indicator is held in a canceled position whereby the cycling and recycling problems characteristic of thermostatic cancellers are completely avoided.

The foregoing objects, advantages, construction and operation of the present invention will become more readily apparent from the following description and accompanying drawings, in which.

Figure 1:
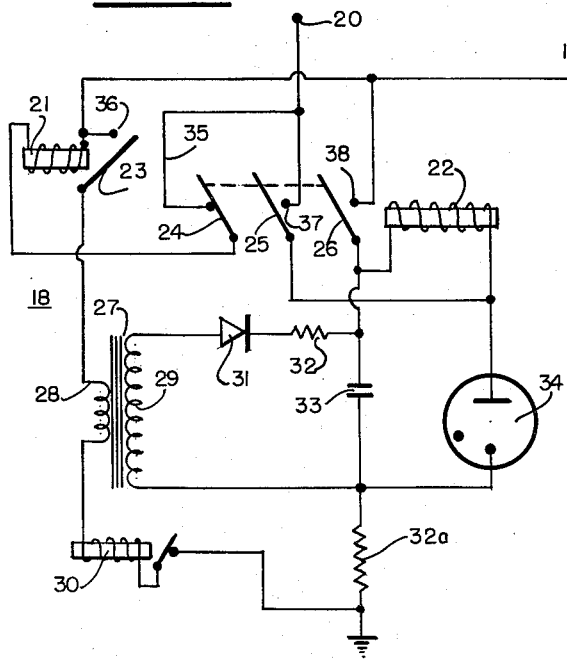
FIGURE 1 is a schematic diagram of a control unit constructed in accordance with one embodiment of the present invention.
Figure 2:
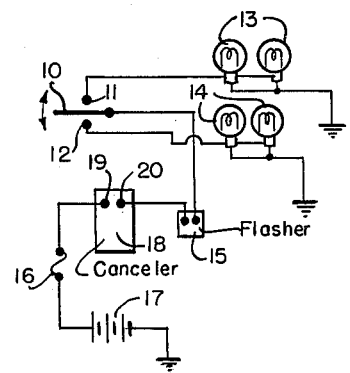
FIGURE 2 is an illustrative representation of the control unit, shown in FIGURE 1, installed in a turn indicator circuit.

Referring now initially to FIGURES 1 and 2, it will be seen that in accordance with the present invention, a turn indicator circuit (see especially FIGURE 2) may comprise a manually operable turn switch 10 normally located at a neutral position between a pair of contacts 11 and 12 respectively associated with indicators such as lights 13 and 14. The lights 13 may, as is well known, constitute "right turn" indicators, while the lights 14 may constitute "left turn" indicators; and which of said lights is actually energized is in turn controled by movement of manual switch 10 away from its neutral position and into contact with one or the other of contacts 11 and 12.

To effect distinctive energization of said sets of lights, the turn indicator switch 10 is normally coupled to a flasher unit 15 which may in turn be connected through a fuse 16 to the automobile battery 17, one terminal of which is grounded. Current may thereby be supplied from battery 17 through fuse 16, flasher unit 15, and turn switch 10 to one or the other of the light sets 13 and 14 depending on the actual position of switch 10; said current, due to flasher unit 15, taking the form of cyclically repeated surges operative to energize lights 13 or 14 at a regular, relatively slow, rate of repetition.

It will be appreciated, of course, that the arrangement thus far described in reference to FIGURE 2 is self-cancelling only if the mechanical arrangement normally assoicated with turn indicator switch 10 and the automobile steering wheel is brought into play by sufficient movement of the automobile steering wheel; and a turn indication, once commenced, will continue until the steering wheel is appropriately manipulated or turn switch 10 is otherwise manually returned to its neutral position. In order to provide for automatic self cancelling operation, under circumstances wherein such mechanical movement of the steering wheel or switch 10 is not effected for a prolonged period of time (e.g. 30 to 50 flashes), the present invention contemplates the provision of an electronic unit 18 inserted as shown between unit 15 and the automobile battery 17 to effect automatic self cancellation after a predetermined period of time. The unit 18, as shown in FIGURE 2, is a self-contained control unit comprising a pair of terminals 19 and 20 one of which is connected to the automobile battery and the other of which is connected to the flasher unit, i.e. the control unit is connected in series with the existing flasher unit; and as a result, the canceller or control unit 18 is adapted for ready installation on existing turn indicator systems.

The unit 18, shown in FIGURE 2, is illustrated in detail in the schematic representation of FIGURE 1. In particular, the unit comprises a pair of relays 21 and 22, with relay 21 being adapted to control movement of a blade 23 while relay 22 controls movement of ganged blades 24 through 26 inclusive. The circuit further includes a transformer 27 having a primary winding 28 and secondary winding 29, with said primary winding 28 being coupled to a vibrator or buzzer unit 30. Secondary winding 29 is in turn coupled through a rectifier 31 and resistor 32 to a capacitor 33, with capacitor 33 being in turn coupled to the coil of relay 22 as well as to a gas-filled glow discharge tube 34. The functioning of the various parts, arranged as shown in FIGURE 1, is such that movement of the turn indicator switch 10 (FIGURE 2) away from the neutral position causes a cycle of operation to commence in which capacitor 33 is charged; and once the voltage across capacitor 33 reaches the firing potential of glow tube 34, said capacitor 33 is rapidly discharged through the coil of relay 22 to effect an energization and holding operation serving to cancel a given turn indication.

This general operation will become more readily apparent from detailed consideration of the circuit shown in FIGURE 1. It should first be noted that the arrangement of relay blades 23 through 26 inclusive, as actually depicted, corresponds to the positioning of these various blades at a time when the turn indicator switch 10 is in its neutral position. If now said switch 10 should be moved into engagement with either of contacts 11 or 12, surges of current will tend to flow through the canceller or control circuit 18 from terminal 19 to terminal 20 (or in the reverse direction if battery 17 is reversely connected, the actual direction of current flow being unimportant) as a result of successive operations of flasher 15. Each such surge of current from terminal 19 (referring to FIGURE 1) passes through the coil of relay 21 and thence through blade 24 of relay 22 and through line 35 back to terminal 20 (and, from there, through the flasher unit 15 and one or the other of light sets 13 and 14), whereby relay 21 is energized to cause blade 23 thereof to move into contact with terminal 36. The current surges, produced by flasher 15, then flow from terminal 19 to terminal 36 through blade 23 to primary winding 28 of transformer 27 as well as through the coil of relay 21, i.e. as the flasher unit 15 cycles, successive surges of current will be caused to so pass through primary winding 28.

Since most automobile battery voltages are in the order of six or twelve volts, and inasmuch as gas filled tubes normally ionize or fire at substantially higher potentials, a voltage step-up is provided by the arrangement of transformer 27 and vibrator 30 as illustrated. Each surge of current passing through primary winding 28 will cause vibrator 30 to cycle repeatedly; and the relatively higher frequency voltage thus impressed across primary winding 28 is transformed to a voltage of substantially 100 volts, or greater (depending on the turns ratio of the transformer which is selected for the firing potential of the particular glow tube 34 selected) at the secondary winding 29. The voltage thus appearing across secondary 29 is rectified by rectifier 31 and is coupled through resistor 32 across capacitor 33, to charge said capacitor.

Resistor 32 is provided to limit the charging rate of capacitor 33 and also serve to limit the current flow through rectifier 31 thereby permitting relatively inexpensive forms of rectifiers, e.g. oxide or crystal diode rectifiers to be employed. In addition, resistor 32, in conjunction with capacitor 33, provides an RC timing circuit which ultimately controls the time delay before turn indicator cancellation is effected; and resistor 32 may in fact be made adjustable to permit variation of this cancellation time within limits.

It will be noted that capacitor 33 is connected, through the coil of relay 22, across glow tube 34; and once the voltage across capacitor 33 reaches the firing potential of said glow tube 34, capacitor 33 will be rapidly discharged through tube 34. The discharge current thus effected passes, as illustrated, through the coil of relay 22 wherefore said relay 22 is energized to move each of its blades 24, 25 and 26 away from the positions illustrated in FIGURE 1 and into an opposite position. Movement of blade 24 breaks the circuit between terminal 19 and terminal 20 which have been previously effected through said blade 24; and as a result, relay 21 is immediately de-energized and blade 23 thereof opens to stop further charging of capacitor 33. Movement of blade 25 into engagement with its associated terminal 37 completes a further discharge circuit through the electrical system of the automobile, particularly through lamps 13 or 14 to ground, thereby aiding in the discharge of capacitor 33 through resistor 32a. In addition, movement of blade 26 into engagement with its associated terminal 38 completes a holding circuit for relay 22 from battery 17 of the automobile through terminals 19 and 38, blade 26, the coil of relay 22, blade 25, and terminal 37 to terminal 20. The battery current thus flowing through relay 22 is sufficient to hold said relay 22 in its energized condition once it has been energized; but the resistance of the coil associated with relay 22 is selected to be sufficiently high so that any current flowing through the coil of relay 22 and thence through one or the other of lamp sets 13 and 14 will be insufficient to operate flasher 15, or the turn indicator lights 13 or 14. A steady current of greatly reduced amount thus continues to flow through the turn indicator circuit; but this current is, by appropriate choice of relay 22, sufficiently small that the indicator lights will not glow and the flasher 15 will not operate.

The new stable condition of operation thus achieved will continue until turn indicator switch 10 is returned to its neutral position either mechanically or by appropriate manipulation of the automobile steering wheel; and once turn indicator switch 10 is so returned to its neutral position, the holding circuit associated with relay 22 will be opened. The circuit will then immediately return to a quiescent condition corresponding to that indicated in FIGURE 1.

By the operation thus described, it will be noted that once a turn indication is commenced by manipulation of switch 10, this turn indication can continue only until capacitor 33 reaches the firing potential of tube 34 whereafter the capacitor is rapidly discharged through said tube 34 and through the electrical system of the automobile to de-energize the turn indication. The discharge of capacitor 33 is so rapid that the entire system may be immediately reactivated by appropriate manipulation of switch 10 if such is desired; and on the other hand, if such manipulation is not effected, the turn indicator will remain "off," and will be held in such "off" condition without recycling.

In one practical embodiment of the invention, the various components illustrated in FIGURE 1 have been as follows: Capacitor 33 is a 200 microfarad capacitor of the electrolytic type, with a voltage rating of 150 volts. Relay 21 may take the form of a single-pole single-throw relay with a coil resistance of substantially 2 ohms to direct current; and is preferably selected to energize with about 0.9 ampere of current flow therethrough. Relay 22 is a telephone type relay with a field coil resistance to direct current of substantially 350 ohms; is of the three-pole double-throw type designed to energize with about 30 milliamperes of current flow therethrough; and preferably has an A.C. impedance in the order of 1200 ohms. Transformer 27 may take the form of a conventional audio output transformer of the type employed in radio receivers, and preferably has a primary impedance of substantially 3 ohms and a secondary impedance of 50,000 ohms. Vibrator 30 may take the form of a two-volt radio vibrator or any other type of buzzer conventionally employed on 2 or 3 volt circuits. Rectifier 31 may take the form of a germanium diode rectifier, e.g. of the type designated 1N34. Resistor 32 is preferably a 7000-ohm one-watt carbon resistor; while resistor 32a is a 33,000 ohm one watt resistor of the carbon type. Tube 34 is a gas-filled glow tube of the type employed in various voltage regulators, and may comprise a 75-volt tube of the type designated VR-75. If such a tube is employed, the tube fires at substantially 90 volts, and the voltage across the tube then drops to 75 volts as the tube commences conduction.

It will be appreciated, of course, that the foregoing parameter values are merely exemplary and that changes may be made without departing from the present invention. The foregoing list of parameters has accordingly been given merely as an example of a circuit actually constructed and adapted to effect cancellation of the turn indicator after a lapse of substantially 30 to 50 flashes of the turn indicator lights.

Figure 3:
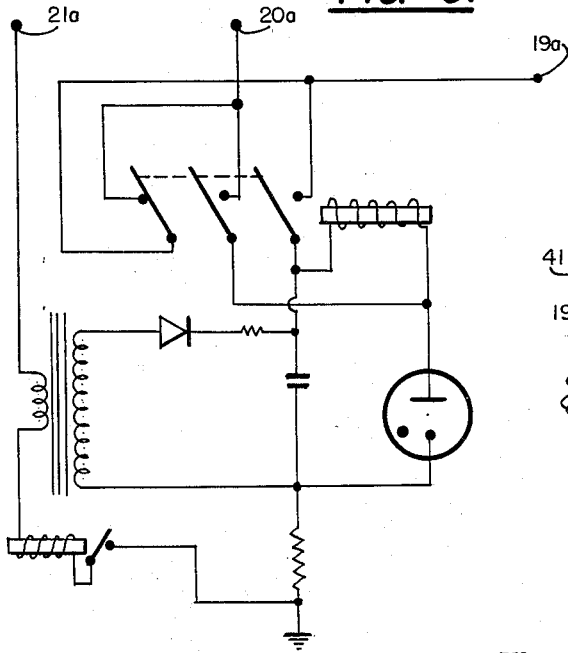
FIGURE 3 is a schematic diagram of an alternative embodiment of the present invention.

The circuit thus far described in reference to FIGURES 1 and 2 has assumed that the flasher 15 is of the so-called two terminal type. Flasher units, e.g. of the type manufactured by Tung-Sol Electric, Inc., Newark, New Jersey, are commercially available, however, wherein the flasher unit is provided with three contacts, one of which is used to energize instrument panel indicator lights. Such three-terminal flashers include an added circuit for indicating proper operation of the turn indicator through energization of a small bulb mounted on the dashboard or instrument panel of the automobile; and the flasher unit itself incorporates a relay or equivalent circuit which is essentially similar to the relay 21 described in reference to FIGURE 1. When therefore the electronic canceller of the present invention is to be employed in conjunction with such a three-terminal flasher, the relay 21 need not be provided since its functions may be assumed by the relay already present in the flasher unit. This alternative arrangement is illustrated in FIGURES 3 and 4.

Figure 4:
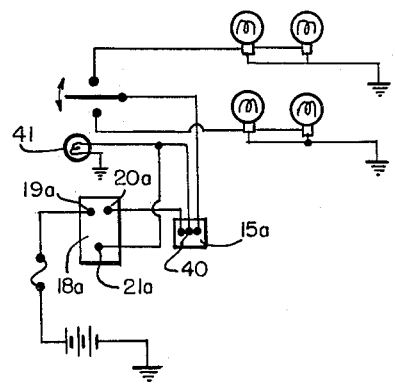
FIGURE 4 is an illustrative representation of the alternative circuit of FIGURE 3 installed in a turn indicator circuit.

In particular, the control unit 18a of FIGURE 4 is provided with three terminals 19a, 20a and 21a. Terminals 19a and 20a correspond essentially to terminals 19 and 20 already described in reference to FIGURES 1 and 2. Terminal 21a (see FIGURE 3) corresponds to the lower end of switch blade 23 (of FIGURE 1) and is connected as illustrated to the third terminal 40 in flasher unit 15a, provided for energizing panel light 41, whereby the relay present in the three-terminal flasher unit 15a is used in place of a separate relay such as 21, already described in reference to FIGURE 1. The other parts of the arrangement shown in FIGURES 3 and 4 and the general operation of the circuit otherwise correspond precisely to that already described in reference to FIGURES 1 and 2; and this description will accordingly not be repeated. The circuit of FIGURES 3 and 4 has nevertheless been shown since, it will be appreciated, the circuit may be simplified somewhat and produced less expensively when it is associated with a three-terminal flasher unit of the type described.

While I have thus described a preferred embodiment of the present invention, many variations will be suggested to those skilled in the art, and certain of these variations have already been discussed. It must therefore be emphasized that the foregoing description is meant to be illustrative only and should not be considered limitative of my invention; and all such variations and modifications as are in accord with the principles described are meant to fall within the scope of the appended claims.

Having thus described my invention, I claim:

1. In a vehicle turn indicator of the type comprising a manually operable switch adapted to complete an energization circuit from a voltage source in said vehicle via flasher means to one or the other of a pair of indicators thereby to energize one of said indicators, the improvement which comprises a self-contained automatic cancellation unit adapted to be electrically connected in series with said flasher means between said indicators and said voltage source for substantially deenergizing the energized one of said pair of indicators upon elapse of a time interval, said automatic cancellation unit comprising a capacitor, means responsive to energization of one of said indicators for coupling said vehicle voltage source to said capacitor thereby to commence charging of said capacitor, said automatic cancellation unit further including a normally nonconductive gaseous discharge tube coupled to said capacitor in said unit and operative to commence conduction thereby to discharge said capacitor when said capacitor has been charged to a predetermined potential, and control means within said unit connected in series with said discharge tube and responsive to discharge current from said capacitor flowing through said tube, said control means including first switching means deenergizing the energized one of said indicators as well as second switching means substantially simultaneously operable to disconnect said voltage source from said capacitor and to connect said voltage source to said control means thereby to halt charging of said capacitor and to hold said control means, once energized, in an energized condition operative to maintain said one of said indicators in its deenergized state.

2. The structure of claim 1 wherein said control means includes means inserting an impedance in series with said one of said indicators thereby to reduce the current flow through said one indicator to a magnitude insufficient to operate said indicator.

3. A self-contained automatic canceller unit adapted to be utilized in conjunction with automobile turn indicators of the type employing a manually operable turn switch operative, upon movement, to complete an energization circuit to one or the other of a pair of electrically operable turn indicators, said canceller unit comprising a transformer and vibrator connected in series with one another, means responsive to movement of said manual turn switch for coupling said series connected transformer and vibrator to the battery of said automobile thereby to produce an output voltage across said transformer in excess of that produced by said battery, said canceller unit further including means for rectifying said transformer output voltage, a capacitor in said canceller unit coupled to said rectifier whereby said capacitor is charged to successively higher voltages with elapse of time, said canceller unit further including voltage responsive means for discharging said capacitor when the voltage across said capacitor reaches a predetermined level, and relay means within said canceller unit energized in response to discharge of said capacitor for varying the state of energization of said energized turn indicator, said relay means including means operable to substantially simultaneously interrupt the charging circuit of said capacitor, said canceller unit including a pair of external terminals one of which is electrically coupled in said unit to said series connected transformer and vibrator and the other of which terminals is electrically connected in said unit to said relay means, said terminals of said self-contained unit being adapted for coupling to the automobile battery and to said indicator means respectively thereby to permit said unit to be inserted in series with the manually operable turn switch of the automobile turn indicator to effect automatic cancelling operations of said turn indicator.

4. The structure of claim 3 including further relay means in series with said transformer for coupling said transformer and vibrator to said automobile battery in response to movement of said turn switch.

5. The structure of claim 3 wherein said voltage responsive means comprises a gaseous discharge tube, said relay means having the coil thereof connected in series with said gaseous discharge tube.

6. The structure of claim 5 wherein said relay means includes movable contacts, operable upon energization of said coil, to connect said coil in series with said energized turn indicator, the impedance of said relay coil being sufficiently high to reduce the current flowing to said energized turn indicator to a level insufficient to effect operation of said turn indicator.

7. The structure of claim 5 wherein said relay means includes movable contacts, operable upon energization of said coil, to complete a holding circuit between said relay coil and said automobile battery for maintaining said relay coil in an energized condition subsequent to discharge of said capacitor.

8. A timing circuit operative to halt a control operation at a predetermined time subsequent to initiation of said operation comprising a voltage source, a capacitor, first normally deenergized relay means energized in response to initiation of said control operation for operatively coupling said source to said capacitor, second normally deenergized relay means including contacts in series with the coil of said first relay means and with said voltage source for permitting energization and operation of said first relay means so long as said second relay means remains deenergized, a gaseous discharge tube coupled to said capacitor and arranged to fire and thereby to complete a low impedance discharge circuit for said capacitor when the voltage across said capacitor reaches a predetermined level, the coil of said second relay means being coupled to said gaseous discharge circuit for energization upon discharge of said capacitor whereby said contacts of said second relay means open to interrupt energization of said first relay means, said second relay means including further contacts operable, upon energization of the coil of said second relay means, to halt said control operation and simultaneously to complete a holding circuit between said voltage source and the coil of said second relay means maintaining said coil of said second relay means in an energized condition thereby to prevent inadvertent reinitiation of said control operation.

9. The circuit of claim 8 wherein said voltage source comprises a battery, a vibrator, and a transformer having a primary winding connected in series with said vibrator and battery upon energization of said first relay means, and rectifier means coupling a secondary winding of said transformer to said capacitor.

10. The circuit of claim 9 wherein said control operation comprises an automotive turn indication, said voltage source including a flasher unit coupled to said battery for effecting successive surges of current, at a relatively low repetition rate, to pass through the coil of said first relay means, said vibrator being operative to increase the repetition rate of current pulses applied to said transformer primary above the repetition rate of said flasher unit.

11. A control unit adapted to be connected in series with an automotive tun indicator circuit of the type employing a flasher generating successive surges of current when said indicator circuit is in an operating condition, and adapted to impede such surges of current after occurrence of a substantially predetermined plurality of said surges thereby to automatically place said indicator circuit in a non-operating condition, said control unit comprising a capacitor, means responsive to each such surge of current for charging said capacitor to successively higher potentials, means for discharging said capacitor when the charge potential thereof reaches a predetermined level, impedance means, and means responsive to discharge of said capacitor for inserting said impedance means in series with the flasher of said turn indicator circuit thereby to reduce the level of current flowing in said turn indicator circuit below that required for further operation of said flasher.

12. The unit of claim 11 wherein said impedance means comprises a relay coil, said means inserting said impedance means in series with said flasher comprising at least one relay blade movable in response to current flow through said relay coil.

13. In an automobile turn indicator of the type responsive to movement of a manually controllable turn switch away from a neutral position for effecting current flow from the automobile battery through turn indicator means via a turn indicator circuit, an automatic turn indication canceller unit adapted to be connected to said turn indicator circuit and responsive to current flow therethrough for effectively deenergizing said turn indicator means after a time delay subsequent to commencement of said current flow, said canceller unit comprising first and second normally deenergized relay means, the coil of said first relay means being connected so as to be energized via a normally closed contact of said second relay means upon occurrence of said current flow in said turn indicator circuit, means responsive to energization of said first relay means for effecting current flow through the coil of said second relay means after a substantially predetermined time delay, thereby to open said normally closed contact to deenergize said first relay means, said second relay means including further contact means movably responsive to current flow through the coil of said second relay means for electrically connecting the coil of said second relay means in series with said turn indicator circuit between said automobile battery and said turn indicator means, the impedance of said series connected coil being selected to reduce the current flowing in said turn indicator circuit to a level insufficient for continued operation of said turn indicator but sufficient for maintaining energization of said second relay means, whereby said turn indicator is caused to be effectively deenergized after said time delay and is maintained in said deenergized state by continued energization of said second relay means until said second relay means is deenergized by return of said manual turn switch to its said neutral position.

14. A turn indicator cancelling unit adapted to be connected in series with an automotive turn indicator circuit of the type effecting successive surges of current through a turn indicator when said indicator circuit is in an operating condition, said cancelling unit comprising a capacitor, switch means responsive to occurrence of said surges of current for charging said capacitor, means for discharging said capacitor when the charge potential thereof reaches a predetermined level, normally deenergized relay means having a relatively high impedance coil connected to receive the discharge current of said capacitor, and contact means on said relay means movably responsive to discharge of said capacitor through the coil of said relay means for inserting said relatively high impedance coil in series with said turn indicator circuit thereby to reduce the level of current flowing in said turn indicator circuit below that required for further operation of said turn indicator, so as to effectively deenergize said turn indicator, said reduced level current flowing through said relatively high impedance relay coil being sufficient in magnitude to hold said relay means in an energized condition thereby to maintain said turn indicator in its deenergized condition.

15. An automatic canceller for automotive turn signal indicators of the type responsive to movement of a turn signal switch from a neutral position to a turn position to complete a current path from an electrical power source through a turn signal indicator, comprising means for reducing the current flow in said path to an amount insufficient to operate said turn indicator, time delay means responsive to movement of said turn signal switch to said turn position for activating said current reducing means a predetermined length of time after said movement of said switch, and means responsive to the return of said switch to said neutral position for immediately deactivating said current reducing means.

16. The canceller of claim 15 wherein said time delay means comprises an electrical pulse counter.

17. The canceller of claim 15 wherein said time delay means has negligible recovery time.

References Cited in the file of this patent
UNITED STATES PATENTS

| | | |
|---|---|---|
| 2,122,222 | Vingerhoets | June 28, 1938 |
| 2,190,687 | Smith et al. | Feb. 20, 1940 |
| 2,306,590 | Chambers | Dec. 29, 1942 |
| 2,308,097 | Murray | Jan. 12, 1943 |
| 2,825,045 | Hollins | Feb. 25, 1958 |
| 2,912,685 | Thomas | Nov. 10, 1959 |